United States Patent [19]
Nagai et al.

[11] Patent Number: 5,811,901
[45] Date of Patent: Sep. 22, 1998

[54] GUIDE RAIL FOR AN ELECTRIC ACTUATOR

[75] Inventors: Shigekazu Nagai; Tadasu Kawamoto; Masahiko Suzuki, all of Ibaraki-ken, Japan

[73] Assignee: SMC Kabushiki Kaisha, Tokyo, Japan

[21] Appl. No.: 870,697

[22] Filed: Jun. 9, 1997

Related U.S. Application Data

[63] Continuation of Ser. No. 415,363, Apr. 3, 1995, Pat. No. 5,637,940.

[30] Foreign Application Priority Data

Apr. 5, 1994 [JP] Japan .................................. 6-67370
Jul. 8, 1994 [JP] Japan .................................. 6-157116

[51] Int. Cl.$^6$ .................................................. F16C 29/04
[52] U.S. Cl. .............................. 310/80; 310/90; 384/50; 384/55
[58] Field of Search .............................. 310/80, 12, 13, 310/15, 68 B, 90; 74/89.15; 424.8 R, 459, 424.8 B, 424, 479.01; 384/50, 51, 53, 54, 55

[56] References Cited

U.S. PATENT DOCUMENTS

| | | | |
|---|---|---|---|
| 4,798,985 | 1/1989 | Chitavat | 310/90 |
| 4,863,149 | 9/1989 | Luther et al. | 269/8 |
| 4,985,651 | 1/1991 | Chitayat | 310/12 |
| 5,198,249 | 3/1993 | Westerkamp | 425/589 |
| 5,320,434 | 6/1994 | Fujihara et al. | 384/620 |
| 5,637,940 | 6/1997 | Nagai et al. | 310/80 |
| 5,676,016 | 10/1997 | Nagai et al. | 74/89.15 |
| 5,711,611 | 1/1998 | Nagai et al. | 384/50 |

*Primary Examiner*—Steven L. Stephan
*Assistant Examiner*—Judson H. Jones
*Attorney, Agent, or Firm*—Oblon, Spivak, McClelland, Maier & Neustadt, P.C.

[57] ABSTRACT

A motor is integrally mounted on one end of a ball screw over which an engaging block is threaded, and an encoder is integrally mounted on the other end of the ball screw for detecting the rotational speed or angular displacement of the motor. The motor, the ball screw, and the encoder are combined into a unitized assembly as a drive unit. The motor and the encoder are positioned on respective steps of a frame, and detachably fastened to the frame.

10 Claims, 16 Drawing Sheets

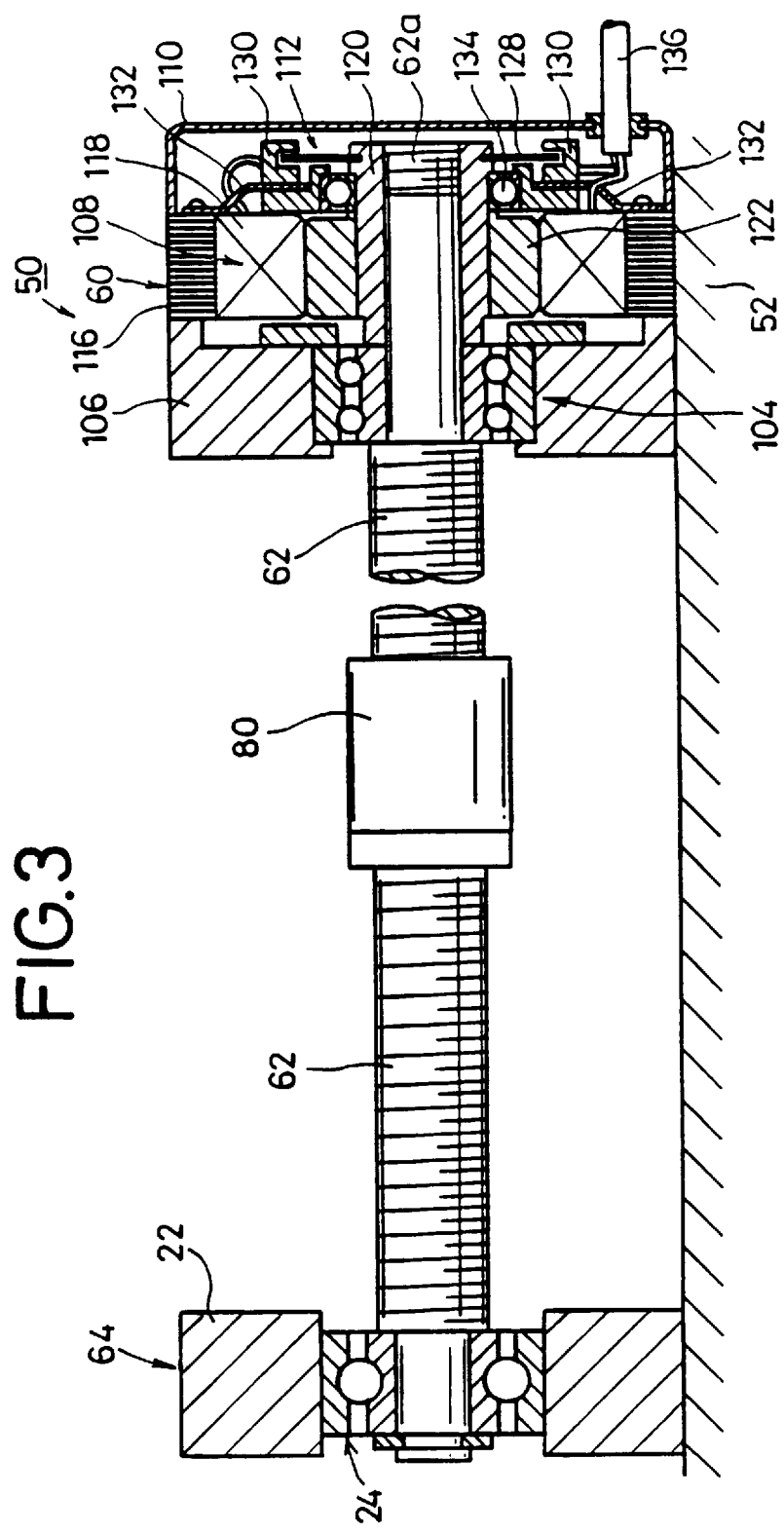

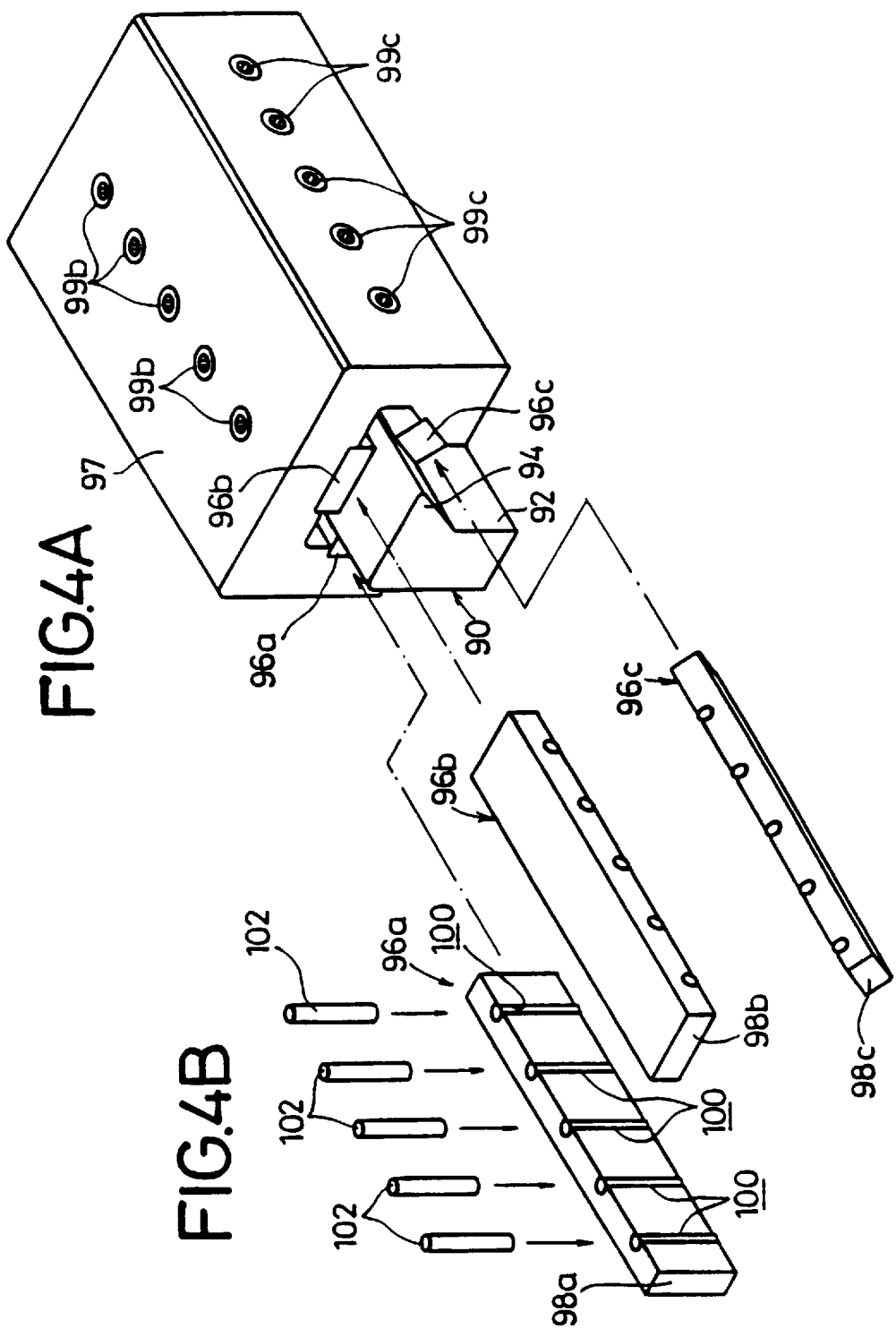

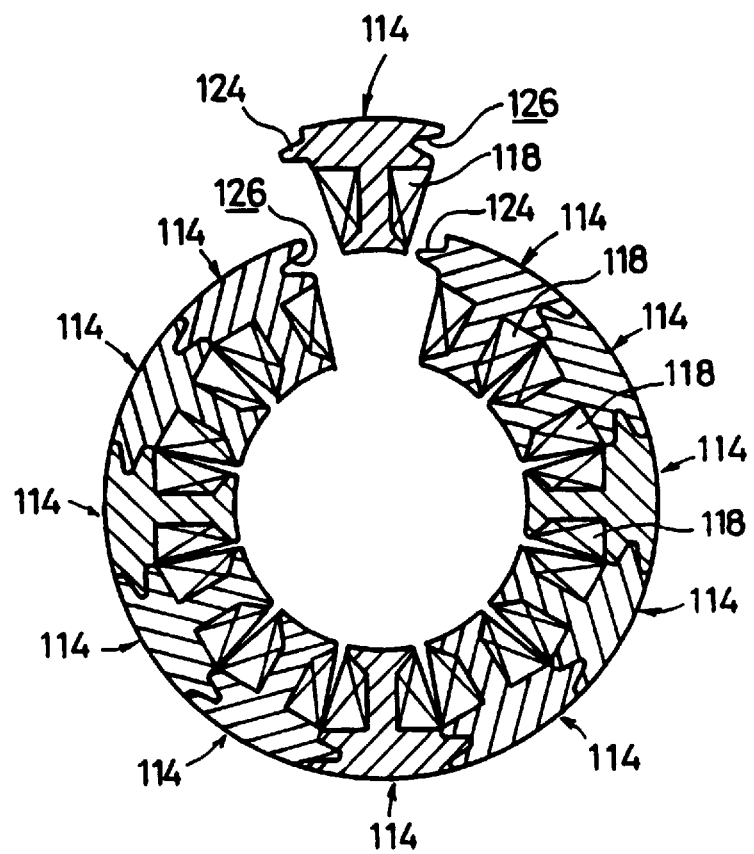

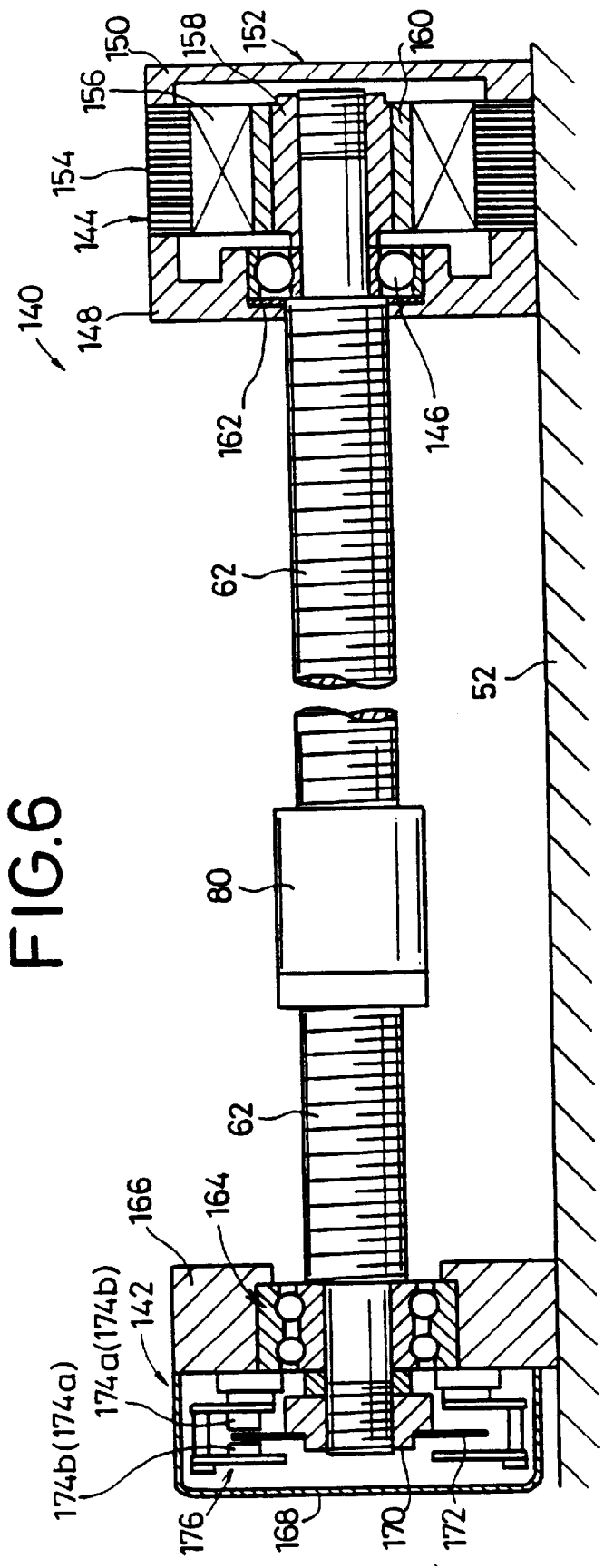

PHASE-Z SIGNAL

PHASE-A SIGNAL

PHASE-B SIGNAL

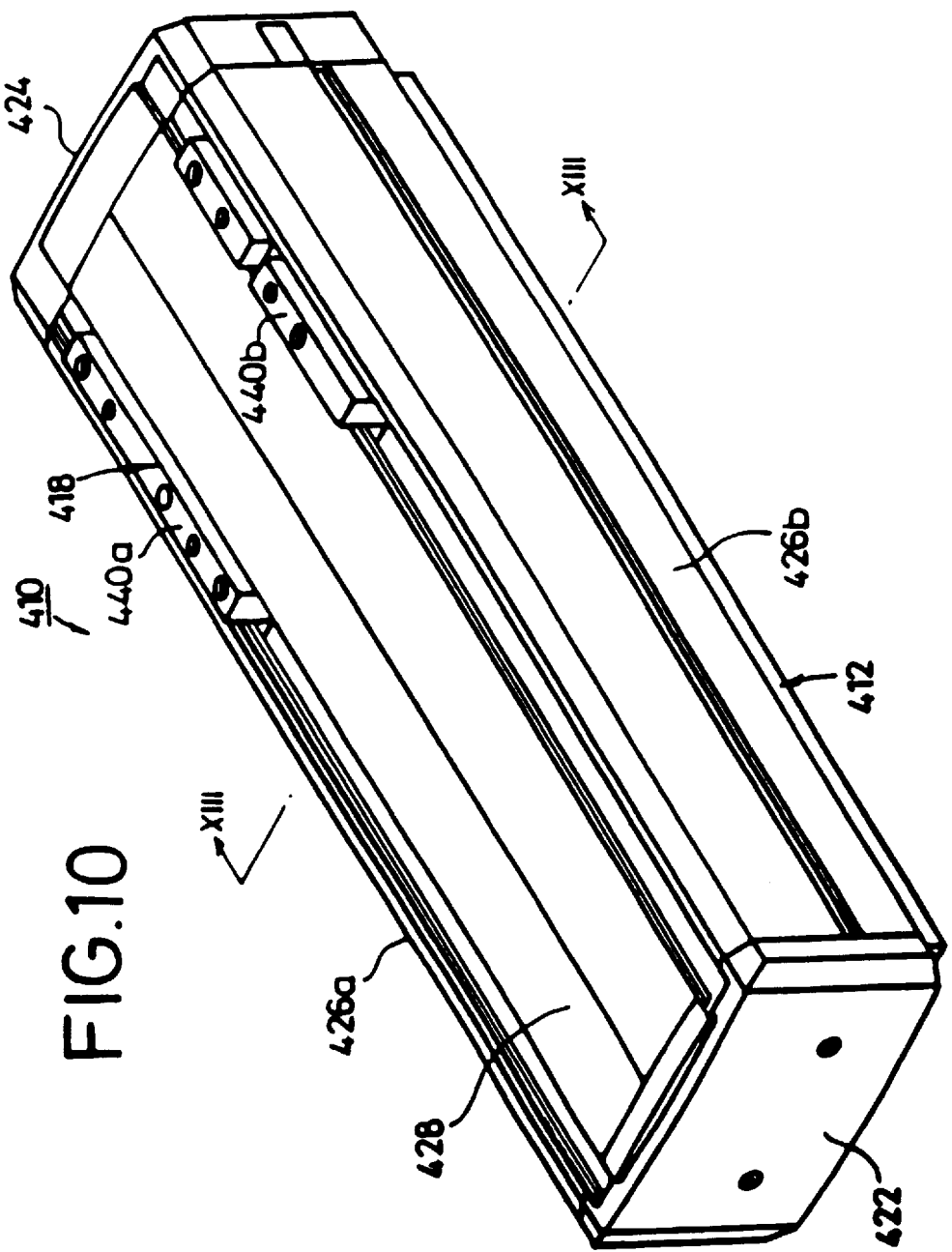

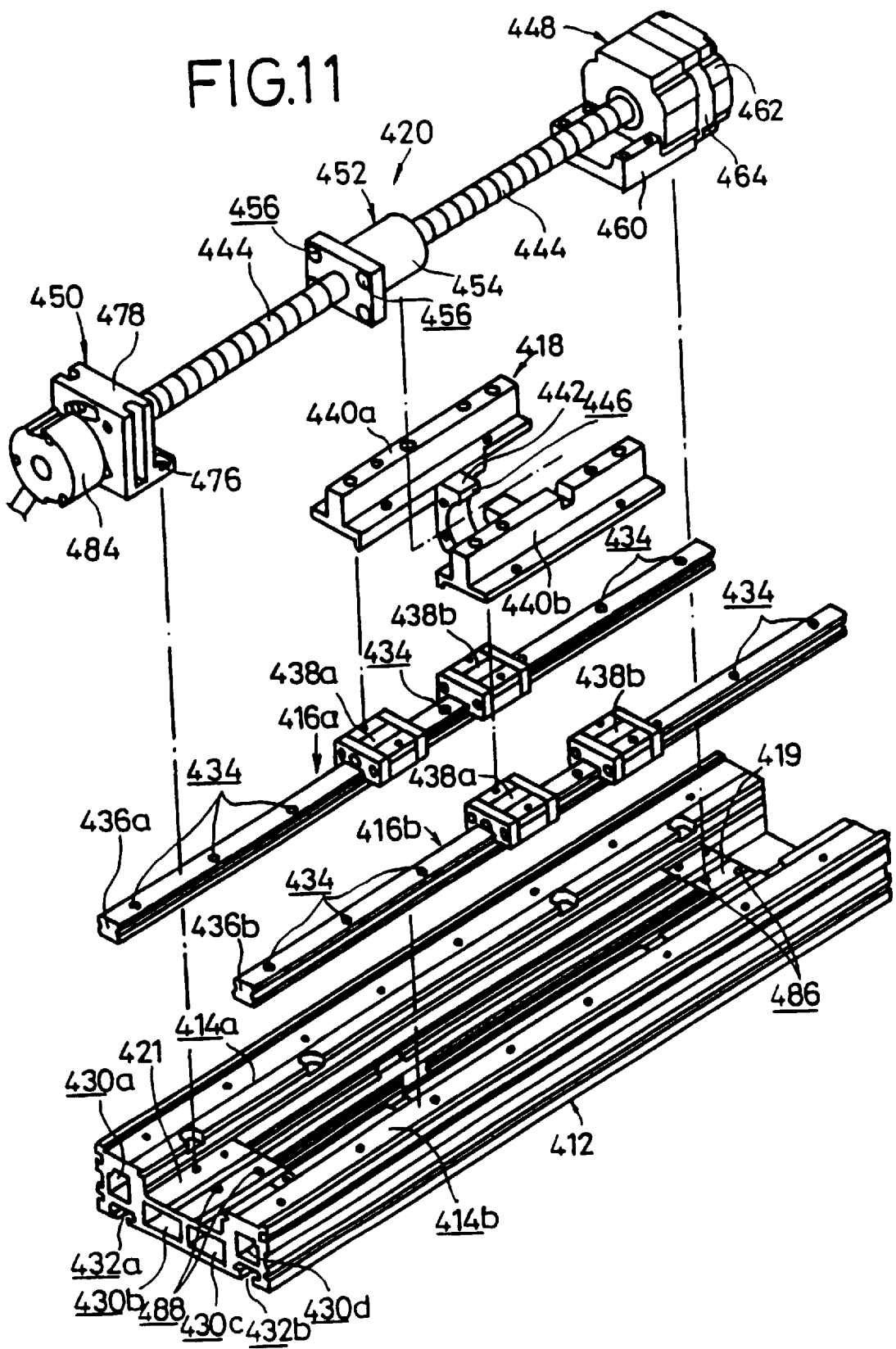

5,811,901

GUIDE RAIL FOR AN ELECTRIC ACTUATOR

This is a Continuation of application Ser. No. 08/415,363, filed on Apr. 3, 1995, now U.S. Pat. No. 5,637,940.

BACKGROUND OF THE INVENTION

1. Field of the Invention

The present invention relates to an electric actuator for transmitting the rotation of an electric motor as a drive source to a slide table for feeding a workpiece carried on the slide table.

2. Description of the Related Art

Electric actuators have heretofore been used to feed workpieces. One conventional electric actuator is shown in FIG. 16 of the accompanying drawings.

The conventional electric actuator, denoted at 2 in FIG. 16, basically comprises an electric motor 10 mounted on an actuator frame 20 and having a motor shaft 16, a drive force transmitting means such as a ball screw or feed screw 4 for converting a rotational drive force from the motor shaft 16 into a linear motion and transmitting the linear motion to another member, and a nut 6 displaceable in the axial direction of the ball screw to move a slide table (not shown) in the longitudinal direction of the actuator frame 20.

Between the electric motor 10 and the ball screw 4, there is disposed a coupling 30 which coaxially interconnects the motor shaft 16 and the ball screw 4 for transmitting the rotation of the motor shaft 16 to the ball screw 4. The ball screw 4 is rotatably supported at one end thereof by a support block 22 remote from the coupling 30. An encoder 12 is disposed in the vicinity of the electric motor 10 or integrally combined with the electric motor 10 for detecting a rotational speed or an angular displacement of the electric motor 10.

With the conventional electric actuator 2, the coupling 30 is required to connect the ball screw 4 and the motor shaft 16 coaxially to each other, and a plurality of bearings 24, 26, 34, 42 are required in a bearing block 8, a joint 18, a drive unit 14 to support the ball screw 4 and the motor shaft 16 coaxially with each other.

It is time-consuming and costly to assemble the above various components of the electric actuator 2. The coupling 30 takes up an extra space other than a range in which the slide table is movable in the longitudinal direction of the actuator frame 20. The space occupied by the coupling 30 imposes a limitation on the range of movement of the slide table such that the slide table cannot move the full longitudinal length of the actuator frame 20.

SUMMARY OF THE INVENTION

It is therefore an object of the present invention to provide an electric actuator which includes a frame having a longitudinal length reduced without reducing the distance that a table mechanism can be displaced, resulting in an overall small size.

Another object of the present invention is to provide an electric actuator which has unitized components disposed on a frame and hence can be assembled in a reduced number of steps and less costly.

According to the present invention, the above objects can be achieved by an electric actuator comprising an elongate straight frame, a drive mechanism including a motor mounted on the elongate straight frame and a detector for detecting a rotational speed or an angular displacement of the motor, the motor having a motor shaft, a table mechanism mounted on the frame for displacement axially along the frame in response to energization of the motor, and drive force transmitting means integral with the motor shaft, for transmitting rotary motion of the motor as linear motion to the table mechanism.

The motor is integral with one end of the drive force transmitting means, and the motor and the drive force transmitting means are combined into a unit, the unit being detachably mounted on the frame.

The detector is also integral with an opposite end of the drive force transmitting means, and combined with the drive force transmitting means so as to be included in the unit.

The electric actuator has no coupling, but the motor and the drive force transmitting means are integral with each other. Therefore, the electric actuator does not require any space for accommodating any coupling which would otherwise be necessary to interconnect the motor and the drive force transmitting means. Consequently, the range in which the table mechanism is displaceable is increased to the extent that the table mechanism can move substantially the full length of the electric actuator.

Since the motor and the drive force transmitting means are combined into the unit, they can easily be installed as the unit on the frame. The detector may also be included in the unit. As a consequence, the electric actuator composed of many components can be assembled efficiently in a relatively short period of time.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a fragmentary longitudinal cross-sectional view of the electric actuator shown in FIG. 1;

FIGS. 4A and 4B are perspective views of a modified guide member;

FIG. 5 is a cross-sectional view of separate stator cores assembled into a circular configuration;

FIG. 6 is a fragmentary longitudinal cross-sectional view of an electric actuator according to a second embodiment of the present invention;

FIG. 10 is a perspective view of an electric actuator according to a fourth embodiment of the present invention;

FIG. 11 is an exploded perspective view of the electric actuator shown in FIG. 10;

DETAILED DESCRIPTION OF THE PREFERRED EMBODIMENTS

[1st Embodiment]

An electric actuator according to a first embodiment of the present invention will be described below with reference to FIGS. 1 through 3.

Figure 1:
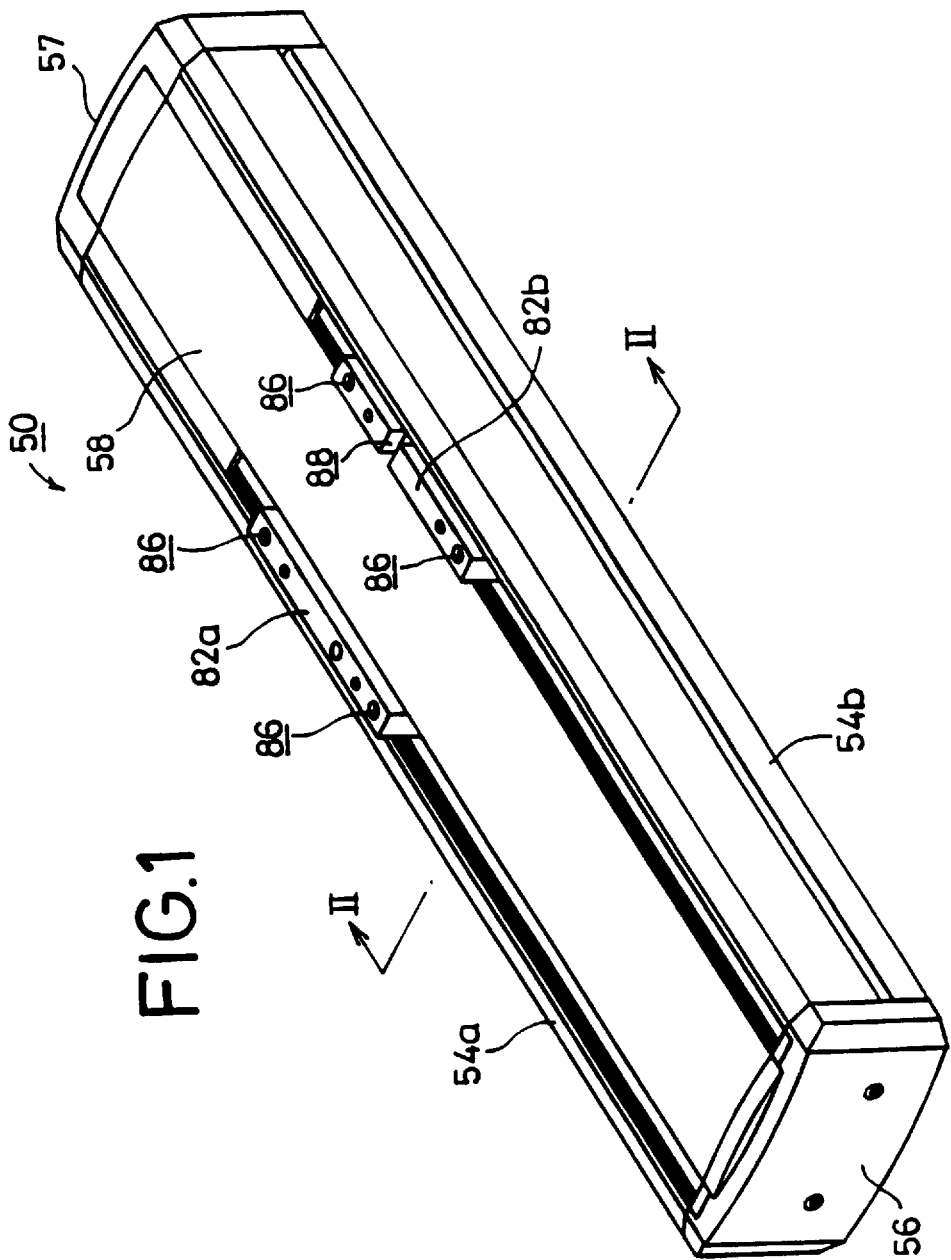
FIG. 1 is a perspective view of an electric actuator according to a first embodiment of the present invention.
Figure 2:
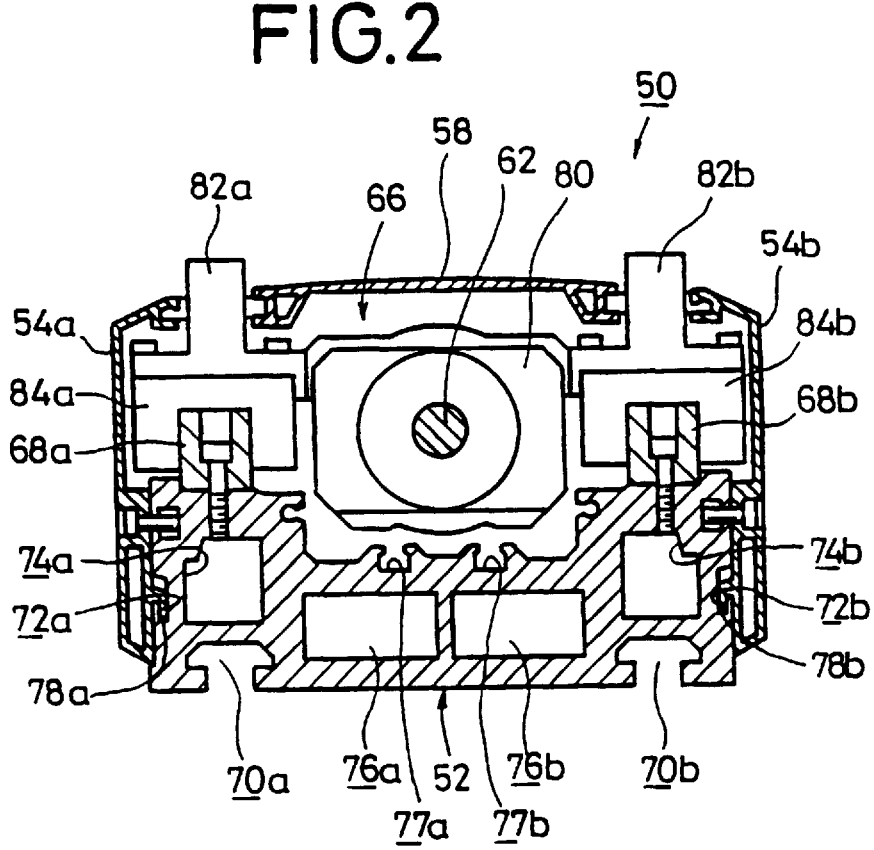
FIG. 2 is a transverse cross-sectional view taken along line II—II of FIG. 1.

The electric actuator, generally denoted at 50 in FIGS. 1 through 3, comprises an elongate frame 52 as a base, a pair of elongate side covers 54a, 54b mounted respectively on transversely opposite sides of the frame 52, a pair of end covers 56, 57 mounted respectively on longitudinally opposite ends of the frame 52, and an elongate top cover 58 engaging upper surfaces of the side covers 54a, 54b.

On the frame 52, there are mounted a drive mechanism 60 fixed to one end of the frame 52 and supporting one end of a ball screw 62, a bearing block 64 fixed to the other end of the frame 52 and supporting the other end of the ball screw 62, and a table mechanism 66 linearly displaceable between the drive mechanism 60 and the bearing block 64 by the ball screw 62 upon rotation thereof. A pair of transversely spaced guide members 68a, 68b is fixed to an upper surface of the frame 52 for linearly guiding the table mechanism 66 when the table mechanism 66 is displaced by the ball screw 62. The bearing block 64 comprises a support block 22 mounted on the frame 52, and the other end of the ball screw 62 is rotatably supported in the support block 22 by a bearing 24.

The frame 52 has two transversely spaced grooves 70a, 70b of an identical T-shaped cross section which are defined in a lower surface thereof and extend parallel to each other in the longitudinal direction of the frame 52. The transversely opposite sides of the frame 52 have respective engaging grooves 72a, 72b defined therein and extending longitudinally therealong for attachment of the side covers 54a, 54b. The frame 52 also has longitudinal passageways 74a, 74b, 76a, 76b defined therein for accommodating electric wires and delivering fluids. The frame 52 has a pair of attachment grooves 77a, 77b defined in an upper surface thereof near the passageways 76a, 76b for attachment of detectors such as automatic switches or the like. The attachment grooves 77a, 77b also serve as wiring grooves for accommodating leads connected to the detectors.

The side covers 54a, 54b have respective substantially L-shaped hooks 78a, 78b disposed on inner sides thereof for engaging in the respective engaging grooves 72a, 72b. The hooks 78a, 78b can be fitted into the respective engaging grooves 72a, 72b when the side covers 54a, 54b are pressed obliquely downwardly against the transversely opposite sides, respectively, of the frame 52. To detach the side covers 54a, 54b from the frame 52, the side covers 54a, 54b are pulled upwardly away from the transversely opposite sides, respectively, of the frame 52. Therefore, the side covers 54a, 54b can easily be installed on and removed from the frame 52.

As shown in FIG. 2, the table mechanism 66 comprises a ball screw bushing 80 for converting rotary motion of the ball screw 62 into linear motion, a pair of table blocks 82a, 82b holding transversely opposite sides, respectively, of the ball screw bushing 80, and a pair of holders 84a, 84b of a channel-shaped cross section interposed between the table blocks 82a, 82b and the guide members 68a, 68b. As shown in FIG. 1, the table blocks 82a, 82b have holes 86 defined in their upper surfaces for coupling a member that is mounted on the table blocks 82a, 82b, and the table block 82b has a recess 88 defined in its upper surface for positioning a workpiece highly accurately.

One or both of the ball screw 62 and the ball screw bushing 80 may be made of ultra-high-molecular-weight polyethylene for increased wear resistance and slidability.

FIGS. 4A and 4B show a modified guide member 90 which may be used instead of each of the guide members 68a, 68b shown in FIG. 2. The guide member 90 has a guide shaft 92 which can be fixed to the upper surface of the frame 52 and a ridge 94 with a sharp corner which extends axially along the guide shaft 92. Roller bearings 96a~96c are disposed between the guide member 90 and a channel-shaped holder 97, so that the holder 97 can slide with respect to the guide member 90 with reduced frictional forces. A plurality of arrays of adjustment screws 99a~99c (only the adjustment screws 99b, 99c are shown) are mounted in respective sides of the holder 97, the arrays of adjustment screws 99a~99c extending longitudinally thereof. The adjustment screws 99a~99c may be turned to vary the pressure applied to the guide member 90 by the roller bearings 96a~96c for thereby adjusting the slidability between the guide member 90 and the roller bearings 96a~96c. Therefore, the holder 97 can be adjusted to slide uniformly in the axial direction of the guide member 90. The guide member 90 and the frame 92 may be integrally formed with each other.

The roller bearings 96a~96c are made of ultrahigh-molecular-weight polyethylene, oleopolyacetal, or the like. The roller bearings 96a~96c comprise respective elongate bearing plates 98a~98c each having a plurality of straight holes 100 defined therein substantially perpendicularly to the axis of the elongate bearing plate and spaced at intervals therealong, and a plurality of sets of cylindrical rollers 102 rotatably disposed in the straight holes 100. The cylindrical rollers 102 of the roller bearings 96a~96c are held in rolling contact with flat surfaces of the guide member 90 for reducing frictional forces when the holder 97 slide with respect to the guide member 90. The roller bearings 96a~96c may be replaced with flat plate bearings.

As shown in FIG. 3, the drive mechanism 60 comprises a housing 106 mounted on the frame 52 and having a bearing 104 by which one end of the ball screw 62 is rotatably supported, a motor 108, and an encoder 112 covered by a cover 110. The housing 106 which supports the ball screw 62 serves as a motor body.

The motor 108 is fixed to the housing 106, and comprises a stator 116 composed of a plurality of separate stator cores 114 (described later on) that are joined together, a plurality of coils 118 wound around the respective stator cores 114, and an annular permanent magnet 122 serving as a rotor which is fixedly mounted on a reduced-diameter end 62a of the ball screw 62 through a sleeve 120.

As shown in FIG. 5, each of the stator cores 114 is of a T-shaped front view and has a finger 124 projecting circumferentially from one side of a head thereof and a recess 126 defined in the other side of the head complementarily to the finger 124. The stator cores 114 are coupled together into a circular configuration with the finger 124 of each of the stator cores 114 being fitted in the recess 126 of an adjacent one of the stator cores 114. Since the coils 118 are wound around the respective separate stator cores 114, more coil turns are employed to generate greater electromagnetic forces than would be if coils were wound on an integral single stator.

As shown in FIG. 3, the encoder 112 comprises a rotatable disk 128 fixed to the sleeve 120 that is rotatable in unison with the reduced-diameter end 62a of the ball screw 62, encoder detectors 130 each having a light-emitting element and a light-detecting element that are positioned one on each side of the rotatable disk 128, and floating joints 132 supporting the encoder detectors 130 and fastened to the stator 116 by screws. The floating joints 132 are in the form of thin resilient plates in the embodiment shown in FIG. 3. However, the floating joints 132 may be made of an elastic material such as rubber. A bearing 134 held by a ring member is disposed between the rotatable disk 128 and the permanent magnet 122, and the reduced-diameter end 62a of the ball screw 62 is rotatably supported by the bearing 134.

The motor 108 and the encoder 112 are connected to a cable 136 which is connected to a servoamplifier (not shown).

Operation and advantages of the electric actuator 50 of the above construction will be described below.

Depending on the environment in which to install the electric actuator 50, the operator may decide to dispense with the top cover 58, the side covers 54a, 54b, and the end covers 56, 57 and use the electric actuator 50 with the table mechanism 66, the bearing block 64, and the drive mechanism 60 being exposed and mounted on the frame 52. The frame 52 is fixed to a member (not shown) through the grooves 70a, 70b of a substantially T-shaped cross section which are defined in the lower surface thereof, and a member (not shown) is joined to the table blocks 82a, 82b by fasteners (not shown) extending through the holes 86 defined therein for feeding a workpiece, for example, carried thereon.

The operator may select a desired cover or covers, and attach the selected cover or covers to the frame 52 depending on the environment in which to install the electric actuator 50. Specifically, the operator may select and attach one or both of the side covers 54a, 546b to the frame 52, and also may select and attach one or both of the end covers 56, 57 to the frame 52. The operator may also attach the top cover 58 in engagement with the side cover or covers 54a, 54b.

After the operator has selected and installed a desired cover or covers on the frame 52, thus completing the electric actuator 50, the servoamplifier (not shown) is energized to supply a current through the cable 136 to the coils 118. Since the current flows orthogonally to the magnetic fluxes generated by the permanent magnet 122, the permanent magnet 122 rotates as the rotor, causing the reduced-diameter end 62a to rotate the ball screw 62 about its own axis. The torque of the motor 108 is controlled by the servoamplifier. When the ball screw 62 is thus rotated, the ball screw bushing 80 is axially displaced on and along the ball screw 62. Therefore, the table blocks 82a, 82b move with the ball screw bushing 80, feeding a workpiece carried thereon.

The electric actuator 50 has no separate coupling between the motor 108 and the ball screw 62, but the ball screw 62 has its reduced-diameter end 62a serving as a motor shaft directly coupled to the ball screw 62. The length of the ball screw 62, i.e., the length of the frame 62, is much smaller than the length of the ball screw or frame of the conventional electric actuator without involving any reduction in the displacement of the table mechanism 66 along the axis of the ball screw 62. As a consequence, the electric actuator 50 is reduced in its overall size.

Furthermore, inasmuch as the coils 118 are wound around the respective separate stator cores 114 (see FIG. 5), the motor 108 is reduced in size in the axial direction of the motor shaft, and increased in diameter in the radially outward direction of the motor shaft. The increased diameter of the motor 108 provides a sufficient space for installing the encoder 112, making it possible to combine the motor windings and the encoder 112 neatly with each other.

Each of the stator cores 114 is usually composed of a laminated assembly of silicon steel sheets in view of the heat generated due to its relative permeability, iron loss, copper loss, hysteresis loss, and eddy current. The number of silicon steel sheets used is reduced because the motor 108 is of a flat shape achieved by reducing the axial dimension thereof and increasing the radial dimension thereof. Consequently, the stator 116 may be made of an inexpensive magnetic material, and hence the electric actuator 50 may be manufactured inexpensively. Since the motor shaft of the motor 108 is relatively short with the flat motor configuration, undesirable vibrations of the motor shaft are reduced, and the critical speed of the motor 108 which is the same as the flexural natural frequency of the motor shaft is increased.

The windings of the stator 116 may be in the form of printed coils to further reduce the axial dimension of the motor 108.

Figure 16:
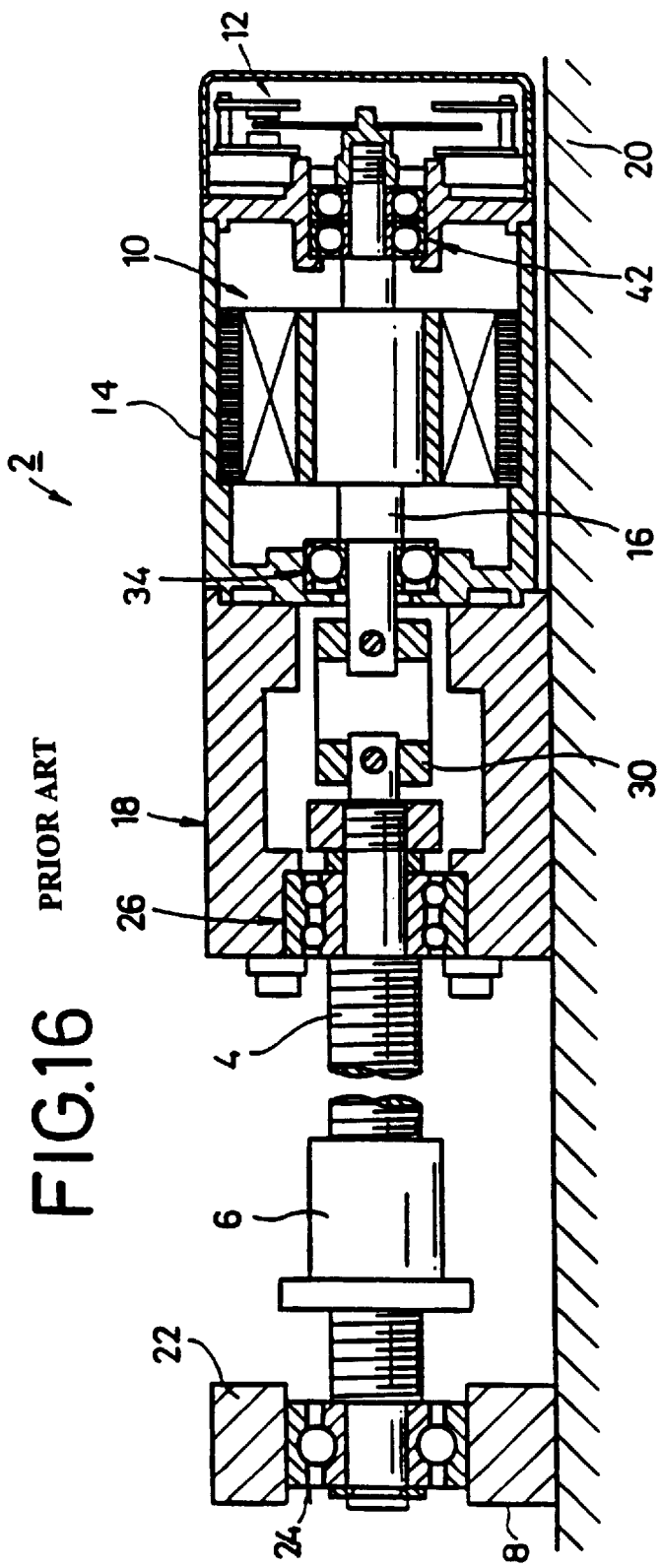
FIG. 16 is a fragmentary longitudinal cross-sectional view of a conventional electric actuator.

As described above, the cost of the electric actuator 50 is greatly reduced because it does not require a coupling which corresponds to the coupling 50 shown in FIG. 16 and a joint which corresponds to the joint 18 shown in FIG. 16.

[2nd Embodiment]

FIG. 6 shows an electric actuator 140 according to a second embodiment of the present invention. Those parts of the electric actuator 140 which are identical to those of the electric actuator 50 shown in FIG. 3 are denoted by identical reference numerals, and will not be described in detail below.

The electric actuator 140 has an encoder 142 mounted on one end of a ball screw 62, and a motor 144 mounted on the other end of the ball screw 62, the encoder 142 and the motor 144 being spaced a certain distance away from each other.

The motor 144 has a deep-groove ball bearing 146 by which the other end of the ball screw 62 is rotatably supported, a motor housing 152 composed of first and second blocks 148, 150, a stator 154 disposed between the first and second blocks 148, 150 and composed of a plurality of separate stator cores 114 of identical configuration which are joined together, a plurality of coils 156 wound around the respective separate stator cores 114, and a permanent magnet 160 fixedly mounted on the ball screw 62 through a sleeve 158. The stator cores 114 are of the same structure as the stator cores 114 of the electric actuator 50 according to the first embodiment. The deep-groove ball bearing 146 serves to prevent the ball screw 62 from flexing. An annular spring washer 162 held against the deep-groove ball bearing 146 has a function to absorb thermal displacements of the ball screw 62. The deep-groove ball bearing 146 may be replaced with a conical roller bearing, a cylindrical roller bearing, or the like.

The encoder 142 comprises an encoder housing 166 having angular ball bearings 164 (held back to back), a cover 168 mounted on the encoder housing 166, a rotatable disk 172 supported on a connector 170 fastened to one end of the ball screw 62, and an encoder detector 176 composed of a light-emitting element 174a for emitting light and a light-detecting element 174b for detecting the light emitted from the light-emitting element 174a through slits defined in the rotatable disk 172. The angular bearings 164 serves to prevent the ball screw 62 from flexing for thereby keep the light-emitting element 174a and the light-detecting element 174b spaced a predetermined clearance from the rotatable disk 172.

With the electric actuator 140 according to the second embodiment, since the motor 144 and the encoder 142 are spaced from each other, it is possible to increase tolerances for coaxial fit of joints between the ball screw 62, the motor 144, and the encoder 142. If the motor 144 and the encoder 142 were integrally coupled to each other, the entire assembly of the motor 144 and the encoder 142 would have to be replaced when either one of the motor 144 and the encoder 142 fails. According to the second embodiment, because the motor 144 and the encoder 142 are independent of each other, when either one of the motor 144 and the encoder 142 fails, only the defective component needs to be replaced. Operation of the electric actuator 140 is the same as that of the electric actuator 50 according to the first embodiment, and will not be described in detail below.

A process of controlling a synchronous AC servomotor which may be used as the drive mechanism in the electric actuator 50, 140 will be described below.

The synchronous AC servomotor is normally composed of three coils U, V, W which are successively energized with given timing to rotate a rotor composed of a permanent magnet.

To the AC servomotor, there is connected an encoder for outputting signals of two phases A and B which are 90° out of phase with each other, a signal of a phase Z representing one pulse per rotation of the AC servomotor, and magnetic pole position signals of phases U, V, W representative of the magnetic pole positions of the coils. Positional and rotational control of the synchronous AC servomotor thus requires a total of six signal lines for carrying the signals of phases A, B, Z, U, V, and W.

An induction AC servomotor generates a revolving magnetic field in response to currents supplied to coils. Since the phases are orthogonal to each other at all times, it is not necessary to detect the position of the revolving magnetic field, and an encoder connected to the induction AC servomotor outputs signals of three phases A, B, Z.

Consequently, the encoder used in combination with a synchronous AC servomotor is not an ordinary encoder, but an encoder dedicated for use with such a synchronous AC servomotor.

According to the process of controlling a synchronous AC servomotor which may be used as the drive mechanism in the electric actuator 50, 140, the synchronous AC servomotor, as with other electric motors, can be controlled with three signals of phases A, B, Z. The encoder that is used may be an optical encoder, a magnetic encoder, or a laser-beam encoder.

Figure 7A:
FIGS. 7A, 7B, 7C and 7D are diagrams illustrative of a process of controlling an encoder.
Figure 7B:
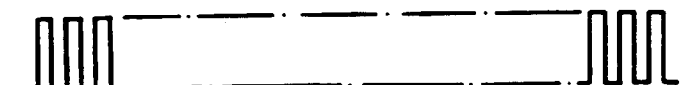
Figure 7C:
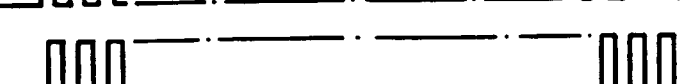
Figure 7D:
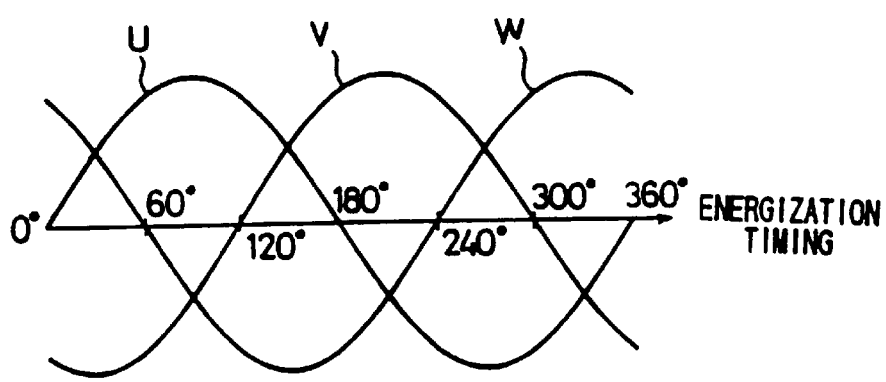

As shown in FIGS. 7A, 7B and 7C signals of phases A, B outputted from the encoder 112, 142 are combined into a combined signal, and pulses of the combined signal per revolution are counted based on a signal of a phase Z, thus producing a signal of 1000 pulses, for example. From the pulse count, commutation signals UE, WE, VE that have been stored are outputted on the basis of the timing of energization of phases U, V, W (see FIG. 7D). For example, a controller stores predetermined UE, WE, VE signals, and outputs UE, WE, VE signals, the UE signal corresponding to an α-th pulse of the combined signal, the WE signal corresponding to a β-th pulse of the combined signal, the VE signal corresponding to a γ-th pulse of the combined signal.

Accordingly, both positional, speed, and acceleration control of the motor and detection of magnetic pole positions can be carried out only based on the three signals of phases A, B, Z outputted from the encoder 112, 142. As a result, it is possible to use ordinary commercially available encoders in combination with all electric motors including synchronous AC servomotors for use as the drive mechanism of the electric actuator according to the present invention. Therefore, the compatibility of the electric actuator according to the present invention with ordinary commercially available encoders is improved. Furthermore, when the synchronous AC servomotor and the encoder are combined with the electric actuator, since signals of phases U, V, W are not required, it is not necessary to bring the signals of phases U, V, W into phase with the encoder signal waveform. A memory may be added to store the signals of phases A, B, Z outputted from the encoders 112, 142, and the stored signals may be transmitted serially to another device. Leads for transmitting the signals of phases A, B, Z may be accommodated in the encoder housing for thereby reducing the space needed for placing such leads.

[3rd Embodiment]

Figure 8A:
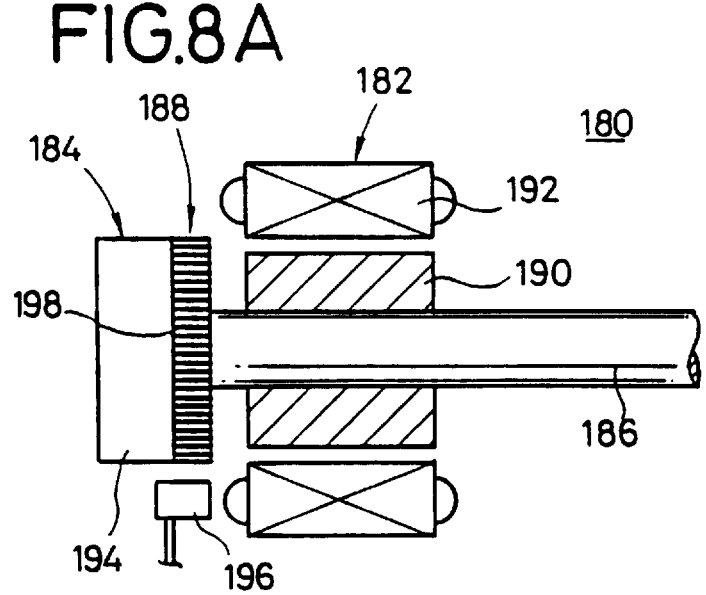
FIGS. 8A and 8B are fragmentary longitudinal cross-sectional views of an electric actuator according to a second embodiment of the present invention and a modification thereof.
Figure 8B:
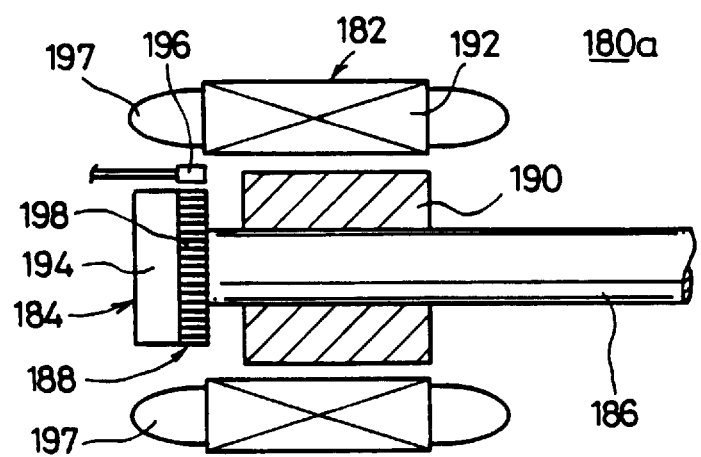

FIG. 8A shows an electric actuator 180 according to a second embodiment of the present invention, and FIG. 8B shows a modification 180a thereof.

As shown in FIG. 8A, the electric actuator 180 includes a drive mechanism 182, a magnetic encoder 184, a ball screw 186 serving as a drive force transmitting means for transmitting drive forces from the drive mechanism 182.

The drive mechanism 182 comprises a permanent magnet 190 fitted over the ball screw 186 and a stator 192 disposed around the permanent magnet 190 and having coils. The magnetic encoder 184 has a cylindrical magnetic drum 188 mounted on an end of the ball screw 186 for rotation therewith and integral with a casing 194, and a magnetic detector 196 comprising a magnetoresistive device, a Hall effect device, or the like. The cylindrical magnetic drum 188 has a plurality of pole sensor tracks 198 disposed on its outer circumferential surface in the form of S- and N-poles. The magnetic detector 196 which is spaced a distance from the outer circumferential surface of the cylindrical magnetic drum 188 detects magnetic poles of the pole sensor tracks 198.

Since the cylindrical magnetic drum 188 integral with the casing 194 is mounted on the end of the ball screw 186 which serves as a motor shaft, the axial length of the drive mechanism 182 is reduced, and hence the overall length of the electric actuator 180 is reduced. When the electric actuator 180 is manufactured, the magnetic encoder 184 can easily be mounted on the ball screw 186.

As shown in FIG. 8B, the modified electric actuator 180a has a magnetic encoder 184 and a magnetic detector 196 which are positioned in a space that is defined between projecting portions 197 of coils wound around a stator 192.

Figure 9A:
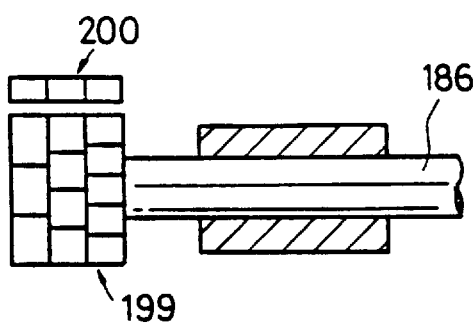
FIGS. 9A and 9B are fragmentary longitudinal cross-sectional views of modified magnetic encoders.
Figure 9B:
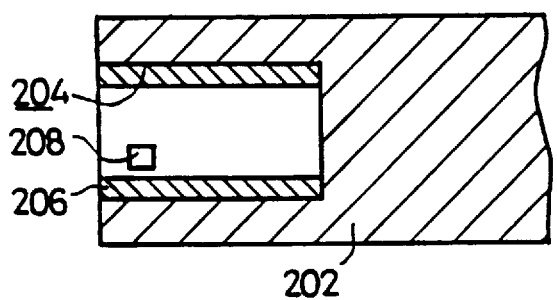

FIGS. 9A and 9B show modified magnetic encoders. FIG. 9A illustrates a magnetic absolute encoder comprising three cylindrical magnetic drums 199 axially joined together and three detectors 200 axially joined together in coaction with the respective cylindrical magnetic drums 199. FIG. 9B illustrates a magnetic encoder having a hole 204 defined axially in an end of a ball screw 202, which may have a diameter of 50 mm or more, a cylindrical drum 206 fitted in the hole 204, and a magnetic detector 208 disposed in the cylindrical drum 206.

[4th Embodiment]

An electric actuator according to a fourth embodiment of the present invention will be described below with reference to FIGS. 10 through 12.

As shown in FIG. 11, the electric actuator, generally denoted at 410, basically comprises an elongate frame 412, a pair of substantially parallel linear guides 416a, 416b fixedly disposed in respective grooves 414a, 414b that are defined in an upper surface of the frame 412, a slide table 418 fixedly mounted on the linear guides 416a, 416b and movable in the longitudinal direction of the frame 412, and a drive unit 420 positioned on and fixed to a pair of steps 419, 421 defined on respective longitudinally opposite ends of the frame 412.

Figure 13:
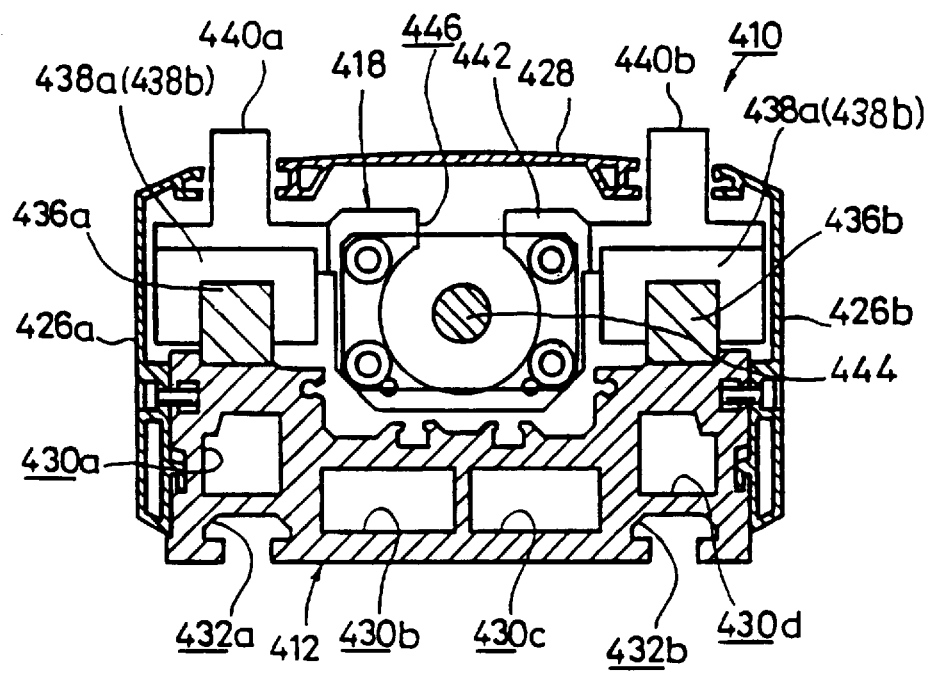
FIG. 13 is a transverse cross-sectional view taken along line XIII—XIII of FIG. 10.

As shown in FIG. 10, the electric actuator 410 also includes a pair of end covers 422, 424 mounted respectively on the longitudinally opposite ends of the frame 412, a pair of side covers 426a, 426b mounted respectively on transversely opposite sides of the frame 412, and a top cover 428 mounted on an upper surface of the frame 412. The end covers 422, 424, the side covers 426a, 426b, and the top cover 428 are detachably mounted on the frame 412. As shown in FIG. 13, the frame 412 has first, second, third, and fourth through holes 430a, 430b, 430c, 430d each of a rectangular cross section which are defined longitudinally therein as passageways for wires or leads of the drive unit 420. The frame 412 also has a pair of transversely spaced grooves 432a, 432b of a substantially T-shaped cross section which are defined in a lower surface thereof and extend in the longitudinal direction thereof, the grooves 432a, 432b being used to connect the frame 412 to another device.

As shown in FIG. 11, the linear guides 416a, 416b are of a substantially identical shape, and comprise a pair of respective guide rails 436a, 436b positioned and fixedly mounted in the respective grooves 414a, 414b by fasteners (not shown) extending through spaced holes 434 defined in the guide rails 436a, 436b, and two pairs of guide blocks 438a, 438b slidably mounted on the respective guide rails 436a, 436b for displacement longitudinally therealong. Rolling members (not shown) such as balls or the like are disposed in annular passages (not shown) defined in sliding surfaces of the guide rails 436a, 436b and the guide blocks 438a, 438b for allowing the guide blocks 438a, 438b to be displaced smoothly along the guide rails 436a, 436b.

As shown in FIGS. 11 and 13, the slide table 418 comprises a pair of fixed blocks 440a, 440b spaced transversely from each other and extending substantially parallel to each other, the fixed blocks 440a, 440b being fastened respectively to the guide blocks 438a, 438b, and a holder block 442 integrally coupled between the fixed blocks 440a, 440b and having a substantially arcuate cross section. The holder block 442 has a gap 446 defined in an upper surface thereof and having a width which is large enough to insert a ball screw 444 of the drive unit 420 therethrough into the block holder 442. The holder block 442 also has a substantially circular opening defined therein which is contiguous to the gap 446.

Figure 12:
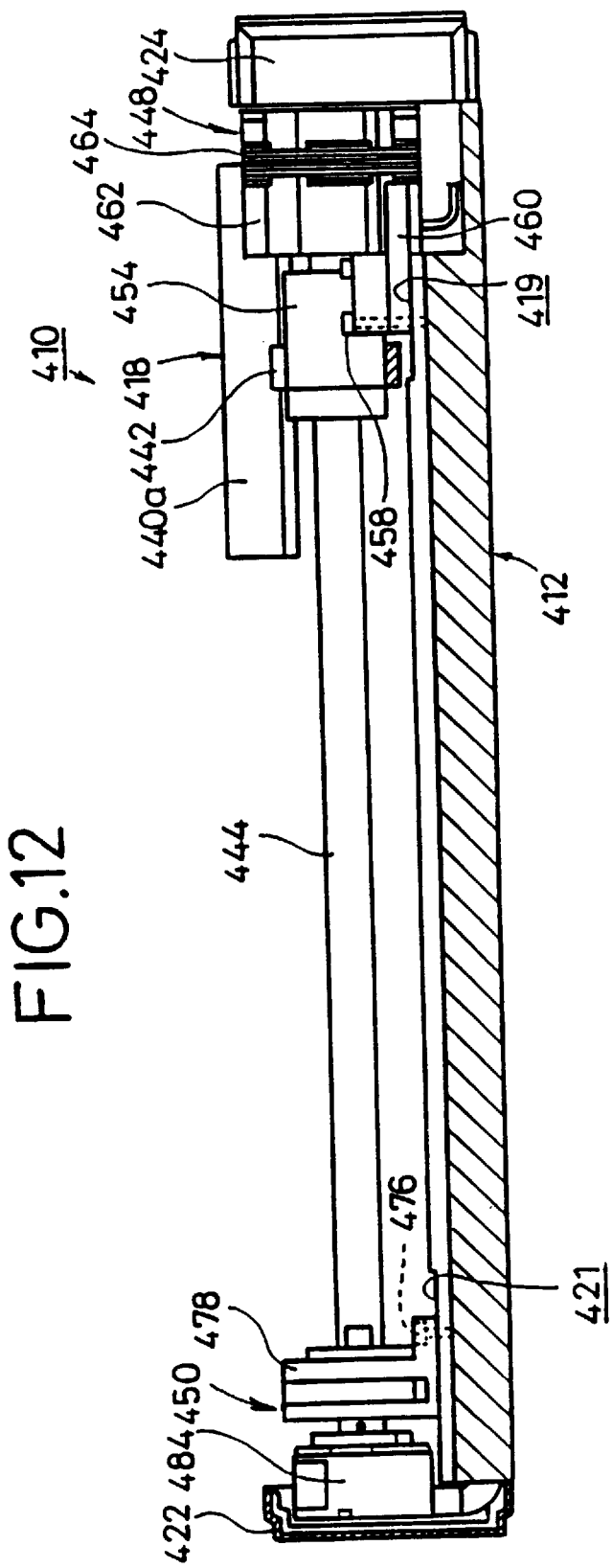
FIG. 12 is a partly sectional fragmentary side elevational view of the electric actuator shown in FIG. 10.

As shown in FIGS. 11 and 12, the drive unit 420 comprises a motor 448 mounted coaxially on one end of a ball screw 444 which serves as a drive force transmitting means, an encoder 450 mounted coaxially on the other end of the ball screw 444, and an engaging block 452 threaded over the ball screw 444 for displacement axially along the ball screw 444. The ball screw 444, the motor 448, the encoder 450, and the engaging block 452 are preassembled into a unitized configuration. The engaging block 452 has a cylindrical member 454 mounted in the opening in the holder block 442 by fasteners (not shown) extending through attachment holes 456 that are defined in a flange of the engaging block 452. The ball screw 444 which functions as a feed screw to move the slide table 418 may be replaced with a timing belt or the like.

Figure 14:
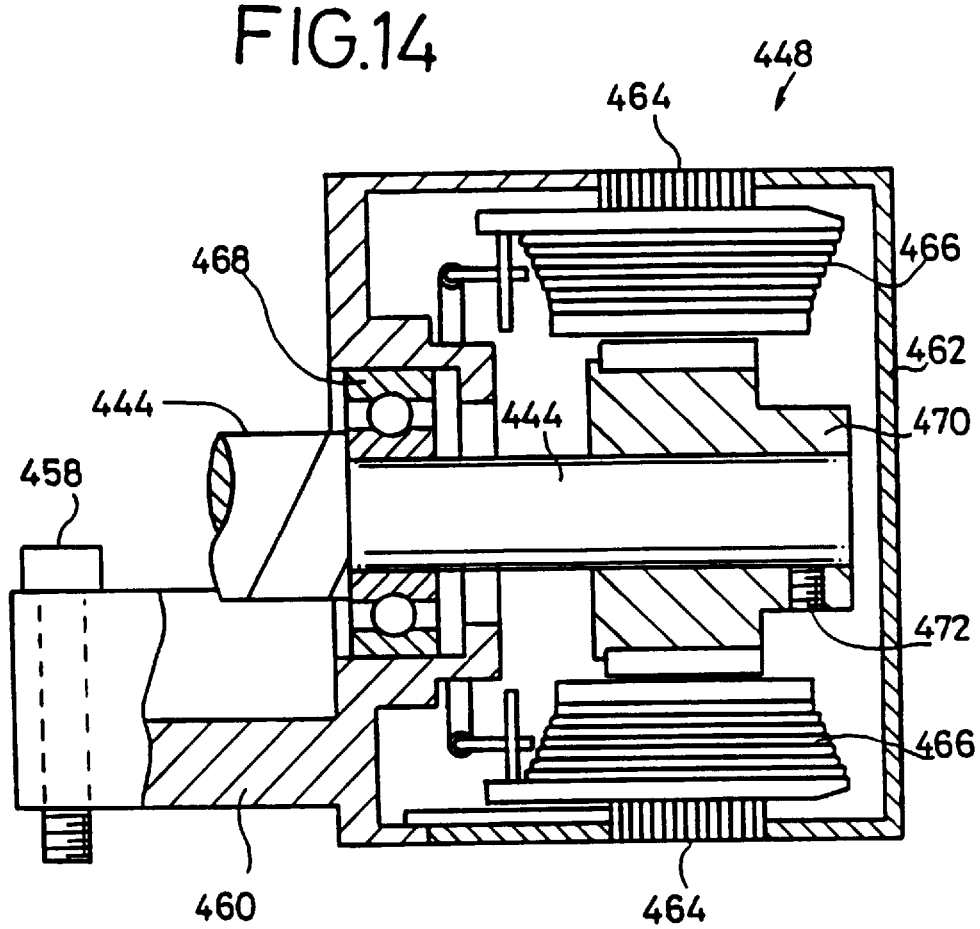
FIG. 14 is a cross-sectional view of a motor of a drive unit of the electric actuator shown in FIG. 10.

As shown in FIG. 14, the motor 448 comprises a motor-fixing block 460 secured to the step 419 of the frame 412 by a screw 458 and positioned in central alignment with the frame 412 by a positioning pin (not shown) inserted through the motor-fixing block 460, and a casing 462 of a substantially rectangular cross section which is integrally joined to the motor-fixing block 460. A stator 464 is mounted on an outer circumferential wall of the casing 462, and a stator coil assembly 466 composed of wound coils is mounted on an inner wall surface of the stator 464. One end of the ball screw 444 is rotatably supported as a motor shaft in the casing 462 by a bearing 468, and the motor 448 has a rotor 470 supported on and fixed to the motor shaft end of the ball screw 444 by a setscrew 472.

Figure 15:
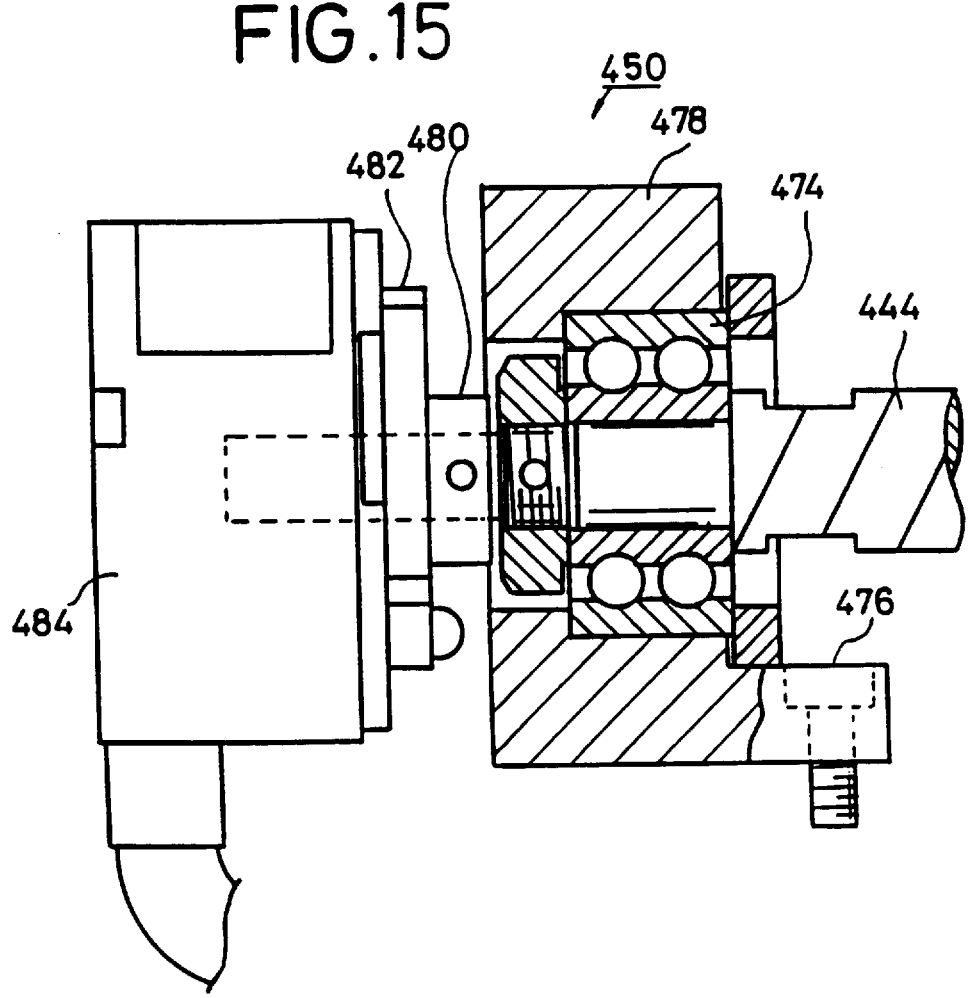
FIG. 15 is a cross-sectional view of an encoder of the drive unit of the electric actuator shown in FIG. 10.

As shown in FIG. 15, the encoder 450 comprises an encoder-fixing block 478 in which the other end of the ball screw 444 is rotatably supported by a bearing 474 and which is secured to the step 421 of the frame 412 by a screw 476, and an encoder unit 484 for detecting the rotational speed or angular displacement of the motor 448, the encoder unit 484 being coupled to the encoder-fixing block 478 by couplings 480, 482. The encoder unit 484 is integrally coupled to and held by the encoder-fixing block 478.

With the motor 448 and the encoder 450 being positioned on and fixed to the respective steps 419, 421 at the respective ends of the frame 412, the ball screw 444 extends highly accurately parallel to the guide rails 436a, 436b. Each of the motor-fixing block 460 and the encoder-fixing block 478 has positioning holes (not shown) defined therein. When positioning pins are inserted through these positioning holes in the motor-fixing block 460 and the encoder-fixing block 478 and also positioning holes 486, 488 (see FIG. 11) defined in the steps 419, 421, the motor-fixing block 460 and the encoder-fixing block 478 are positioned highly accurately in central alignment with the frame 412.

While the motor 448, the ball screw 444, and the encoder 450 are unitized into one assembly as the illustrated drive unit 420, a stepping motor may be used as the motor 448, and only the motor 448 and the ball screw 444 may be combined into a unitized assembly.

The encoder unit 484 may be replaced with a sensor such as a limit switch mounted on the encoder-fixing block 478.

Operation and advantages of the electric actuator 410 according to the fourth embodiment will be described below.

First, the electric actuator 410 is assembled as follows: As shown in FIG. 11, the linear guides 416a, 416b are positioned in the grooves 414a, 414b, respectively, in the frame 412, and secured in position. Then, the fixed blocks 440a, 440b of the slide table 418 are fastened to the respective pairs of guide blocks 438a, 438b of the linear guides 416a, 416b so as to extend therealong. The engaging block 452 of the drive unit 420 is fitted in the holder block 442 of the slide table 418. At this time, the ball screw 444 is inserted through the gap 446 into the opening in the holder block 442, and then the ball screw 444 is axially moved until the cylindrical member 454 is fitted into the opening in the holder block 442.

Thereafter, the motor 448 and the encoder 450 are positioned on and fastened to the frame 412. Specifically, the motor-fixing block 460 and the encoder-fixing block 478 are placed on the respective steps 419, 421 of the frame 412, thus holding the ball screw 444 highly accurately parallel to the guide rails 436a, 436b. Thereafter, the motor-fixing block 460 and the encoder-fixing block 478 are positioned in central alignment with the frame 412 by positioning pins (not shown), and fastened thereto by fasteners.

After the linear guides 416a, 416b, the slide table 418, and the drive unit 420 have been assembled onto the frame 412, the end covers 422, 424, the side covers 426a, 426b, and the top cover 428 are installed on the frame 412. Depending on how the user uses the electric actuator 410, the covers may be dispensed with, and the linear guides 416a, 416b, the slide table 418, and the drive unit 420 may be exposed on the frame 412.

The electric actuator 410 thus assembled operates as follows: When a power supply connected to the motor 448 is energized, the motor 448 rotates the ball screw 444 whose one end functions as its motor shaft. The rotational speed or angular displacement of the motor 448 is detected by the encoder unit 484, which supplies a detected signal through leads in the through holes 430a–430d to a controller (not shown).

The rotary motion of the ball screw 444 is transmitted to the engaging block 452 threaded over the ball screw 444, causing the slide table 418 holding the engaging block 452 to move smoothly linearly along the linear guides 416a, 416b. Therefore, a workpiece (not shown) carried on the slide table 418 can be fed in the longitudinal direction of the electric actuator 410.

As described above, the motor 448 and the encoder 450 are coaxially and integrally mounted on the respective ends of the ball screw 444, and the motor 448, the encoder 450, the ball screw 444, and the engaging block 452 are combined in advance into a unitized assembly as the drive unit 420. Accordingly, the electric actuator 410 can be assembled in a smaller number of steps and at a lower cost than conventional electric actuators whose components are individually assembled together.

The drive unit 420 preassembled as a unitized assembly can be mass-produced. In the event of a failure of the drive unit 420, the drive unit 420 can easily be detached from the frame 412 and be replaced with a new drive unit 420.

The motor shaft end of the ball screw 444 and the ball screw 444 itself are coaxially coupled to each other without any coupling interposed therebetween. Therefore, the slide table 418 can move in a range which is longer than if such a coupling were employed, by the length of the coupling. As a result, the slide table 418 can move substantially the full length of the frame 412.

Although certain preferred embodiments of the present invention has been shown and described in detail, it should be understood that various changes and modifications may be made therein without departing from the scope of the appended claims.

What is claimed is:

1. A guiding mechanism comprising:

an elongate straight guide rail;

a guide block to grip and move along said elongate straight guide rail; and a roller bearing mounted on said guide block and displaceably disposed on said elongate straight guide rail for movement along said guide rail with said guide block;

wherein said roller bearing has a hole defined therein extending in a direction substantially perpendicular to a direction of displacement of said roller bearing, and a rolling member rotatable disposed in said hole in rolling contact with said elongate straight guide rail.

2. A guiding mechanism according to claim 1, wherein said rolling member comprises a cylindrical roller.

3. A guiding mechanism according to claim 1, further comprising a guide block to grip said elongate straight guide rail by at least a horizontal surface, a vertical surface and a downwardly tilted surface of said elongate straight guide rail, and a plurality of said roller bearings are interposed between said guide block and said guide rail at each of said horizontal, vertical and downwardly tilted surfaces.

4. A guiding mechanism according to claim 1, wherein said roller bearing is made of ultrahigh-molecular-weight polyethylene or oleopolyacetal.

5. A guiding mechanism according to claim 2, wherein said roller bearing has a bearing plate in which a plurality of said holes spaced in parallel at predetermined intervals are defined for a plurality of said cylindrical rollers to be rotatably disposed in said holes.

6. A guiding mechanism according to claim 3, wherein a plurality of screws are mounted in respective sides of said guide block, the arrays of said screws extending longitudinally for adjusting the pressure of said roller bearings applied to said elongate straight guide rail.

7. A guiding mechanism comprising:

an elongate straight guide rail;

a guide block to grip and move along said elongate straight guide rail; and a bearing member mounted on said guide block and disposed in contact with said elongate straight guide rail for movement along said guide rail;

wherein said bearing member is slidably held in a hole and is held in rolling contact with said elongate straight guide rail, wherein an axis of rotation of said bearing member is perpendicular to a direction of said elongate straight guide rail.

8. A guiding mechanism comprising:

an elongate straight guide rail;

a guide block to grip and move along said elongate straight guide rail; and a bearing member mounted on said guide block and displacing along said elongate straight guide rail;

where in said bearing member comprises a member which is slidably disposed in a hole but the movement thereof is limited therein and which is held in rolling contact with said elongate straight guide rail.

9. The guiding mechanism according to claim 7, wherein said bearing member is slidably disposed in said hole but sliding movement thereof is limited.

10. The guiding mechanism according to claim 7, wherein said rolling member comprises a cylindrical roller, the axis of said cylindrical roller corresponding to said axis of rotation.

* * * * *